United States Patent
Haidt et al.

(10) Patent No.: US 12,042,964 B2
(45) Date of Patent: Jul. 23, 2024

(54) METHOD FOR PRODUCING A DIAPHRAGM FOR A DIAPHRAGM VALVE

(71) Applicant: GEMÜ Gebr. Müller Apparatebau GmbH & Co. Kommanditgesellschaft, Ingelfingen (DE)

(72) Inventors: Harald Haidt, Öhringen (DE); Klaus Frankenbach, Forchtenberg (DE); Maximilian Renner, Neudenau (DE)

(73) Assignee: GEMÜ Gebr. Müller Apparatebau GmbH & Co. Kommanditgesellschaft, Ingelfinge (DE)

( * ) Notice: Subject to any disclaimer, the term of this patent is extended or adjusted under 35 U.S.C. 154(b) by 67 days.

(21) Appl. No.: 17/517,802

(22) Filed: Nov. 3, 2021

(65) Prior Publication Data

US 2022/0134613 A1 May 5, 2022

(30) Foreign Application Priority Data

Nov. 3, 2020 (DE) ...................... 10 2020 128 923.5

(51) Int. Cl.
  *B29C 45/00* (2006.01)
  *B29C 45/26* (2006.01)
  *B29L 31/00* (2006.01)

(52) U.S. Cl.
  CPC .......... *B29C 45/0053* (2013.01); *B29C 45/26* (2013.01); *B29L 2031/755* (2013.01)

(58) Field of Classification Search
  CPC ............... B29C 45/0053; B29C 45/561; B29C 2045/565; B29C 2045/0077
  See application file for complete search history.

(56) References Cited

U.S. PATENT DOCUMENTS

| | | | | |
|---|---|---|---|---|
| 4,309,163 | A | * | 1/1982 | Cottancin ............. B29C 45/322 425/572 |
| 5,350,288 | A | * | 9/1994 | Kimoto ............... B29C 45/2669 425/149 |
| 10,330,094 | B2 | | 6/2019 | Gledhill, III et al. |
| 2005/0110190 | A1 | * | 5/2005 | Giardini ............. B29C 45/1676 428/480 |

(Continued)

FOREIGN PATENT DOCUMENTS

| DE | 19800828 A1 | | 7/1999 |
|---|---|---|---|
| DE | 102005009008 | * | 4/2006 |

(Continued)

OTHER PUBLICATIONS

J. Greener: "Producing precision parts at injection speeds" Plastics Engineering, Society of Plastics Engineers, Inc. Jun. 1, 1987.

(Continued)

*Primary Examiner* — Edmund H Lee
(74) *Attorney, Agent, or Firm* — George R. McGuire; Bond Schoeneck & King PLLC

(57) ABSTRACT

The invention relates to a method for producing a diaphragm for a diaphragm valve. The method includes the steps of conveying a plastics melt through at least one feed channel into a mold cavity which is delimited by a first mold and a second mold; moving the first and second molds toward one another; removing the at least one diaphragm from the mold cavity; and cutting off a sprue from the at least one diaphragm removed from the mold cavity.

10 Claims, 7 Drawing Sheets

(56) References Cited

U.S. PATENT DOCUMENTS

2005/0253298 A1* 11/2005 Takayama ............ H04R 31/003
                                                       381/174
2009/0096128 A1   4/2009 Huang

FOREIGN PATENT DOCUMENTS

| EP | 0 022 009 A1 | 1/1981 |
|----|--------------|--------|
| EP | 0332899 * | 9/1989 |
| EP | 1 518 656 A1 | 3/2005 |
| JP | H03202334 A | 9/1991 |
| JP | H06234141 A | 8/1994 |
| KR | 20190001061 A | 1/2019 |
| KR | 20190006281 A | 1/2019 |
| WO | 2020190133 A1 | 9/2020 |

OTHER PUBLICATIONS

"Bildschirmgrafiken der Maschinensteuerung CC200" Internet Citation. Sep. 18, 2003.
EP Search Report, dated Mar. 30, 2022. pp. 1-46.
German Search Report of Application 10 2020 128 923.5 filed Nov. 3, 2020.

* cited by examiner

METHOD FOR PRODUCING A DIAPHRAGM FOR A DIAPHRAGM VALVE

CROSS-REFERENCE TO RELATED APPLICATION

The present application relates and claims priority to German Patent Application No. 10 2020 128 923.5, filed Nov. 3, 2020, the entirety of which is hereby incorporated by reference.

BACKGROUND

The invention relates to a method for producing a diaphragm for a diaphragm valve and to a diaphragm.

PFTE is a material that cannot be injection molded. The processing steps for the production of a PFTE diaphragm for a diaphragm valve comprise pressing a powder, sintering the resulting green product and hot forming (quenching).

On the other hand, thin-walled components cannot be produced by injection molding with long flow paths.

SUMMARY OF THE INVENTION

The object of the invention is therefore to simplify the complex process for producing a diaphragm for a diaphragm valve and at the same time to provide a diaphragm for high-purity processes.

The object of the invention is achieved by a method and by a diaphragm. Advantageous embodiments and examples of the invention can be found in the description and in the drawings.

A first aspect of the description relates to a method for producing a diaphragm for a diaphragm valve. The method comprises: conveying a plastics melt through at least one feed channel into a mold cavity which is delimited by a first mold and a second mold; moving the first and second molds toward one another; removing the at least one diaphragm from the mold cavity; and cutting off a sprue from the at least one diaphragm removed from the mold cavity.

The method provided advantageously simplifies the manufacture of the diaphragm for the diaphragm valve. In particular, a material-saving production method is provided that allows the thin-walled diaphragm to be manufactured.

An advantageous example is characterized in that an opening of the at least one feed channel is arranged adjacent to an adjustment axis of the diaphragm or the adjustment axis of the diaphragm extends through the opening of the at least one feed channel.

The cavity can advantageously be filled uniformly from this substantially centrally arranged sprue. The plastics melt thus flows radially evenly into the mold cavity in all directions and thus prevents internal stresses in the diaphragm produced in this way. In the liquid state, the plastics melt thus covers a short flow path to the outside. This is particularly advantageous for shear-sensitive PFA.

In an advantageous example, an opening of the at least one feed channel adjoins, in portions, a narrow side of the diaphragm to be produced.

In this way, a sprue in the region of the diaphragm, which is later exposed to flexing movements, can be avoided.

An advantageous example is characterized in that the first mold with the at least one feed channel has a negative contour of the dry side of the diaphragm, and the second mold having a negative contour of the wet side of the diaphragm.

The wet side, i.e. the side of the diaphragm that comes into contact with the process medium, is advantageously produced without a sprue. Accordingly, the surface of the wet side of the diaphragm is not disturbed by unwanted sprue residues or reworked regions. Any problematic surface tensions generated by the sprue are also avoided on the wet side. This can prevent unintentionally accumulated dirt particles on the wet side of the diaphragm. The cleanability of the wet side of the diaphragm is improved.

An advantageous example is characterized in that the method comprises: introducing a connecting portion of a connecting pin for connection to a valve rod into a central recess of the first mold, a holding portion of the connecting pin being spaced apart from a surface of the first mold surrounding the recess and from a surface of the second mold.

The connecting pin is advantageously surrounded by the plastics melt on both sides as a result of the aforementioned spacing and is thus fixed to the diaphragm so as to be secured against pulling out.

It is of course also possible to produce the connecting portion from the material of the diaphragm. In this way, the material of the diaphragm can be formed directly in the injection compression molding process. Alternatively, the connecting portion can also be arranged subsequently by welding or the like.

An advantageous example is characterized in that the first mold is arranged so as to be stationary, and the second mold is movable with respect to the first mold.

For example, the feed channel is advantageously designed in the first fixed form, which simplifies the entire device for producing the diaphragm.

An advantageous example is characterized in that the plastics melt comprises at least one fluoropolymer, in particular a perfluoroalkoxy polymer, PFA.

By using the method described, it is possible to produce complex and thin diaphragms for diaphragm valves with PFA, for example. It also makes it possible to implement high-purity process environments without expecting an undesired entry of material from the diaphragm into the process medium.

An advantageous example is characterized in that the plastics melt is free of additives.

Due to the additive-free design of the diaphragm, the area of application of the diaphragm for highly sterile applications is expanded, since undesired material entry is prevented.

A second aspect of the description relates to a diaphragm for a diaphragm valve, which is produced by means of the method according to the first aspect.

DETAILED DESCRIPTION

Figure 1:
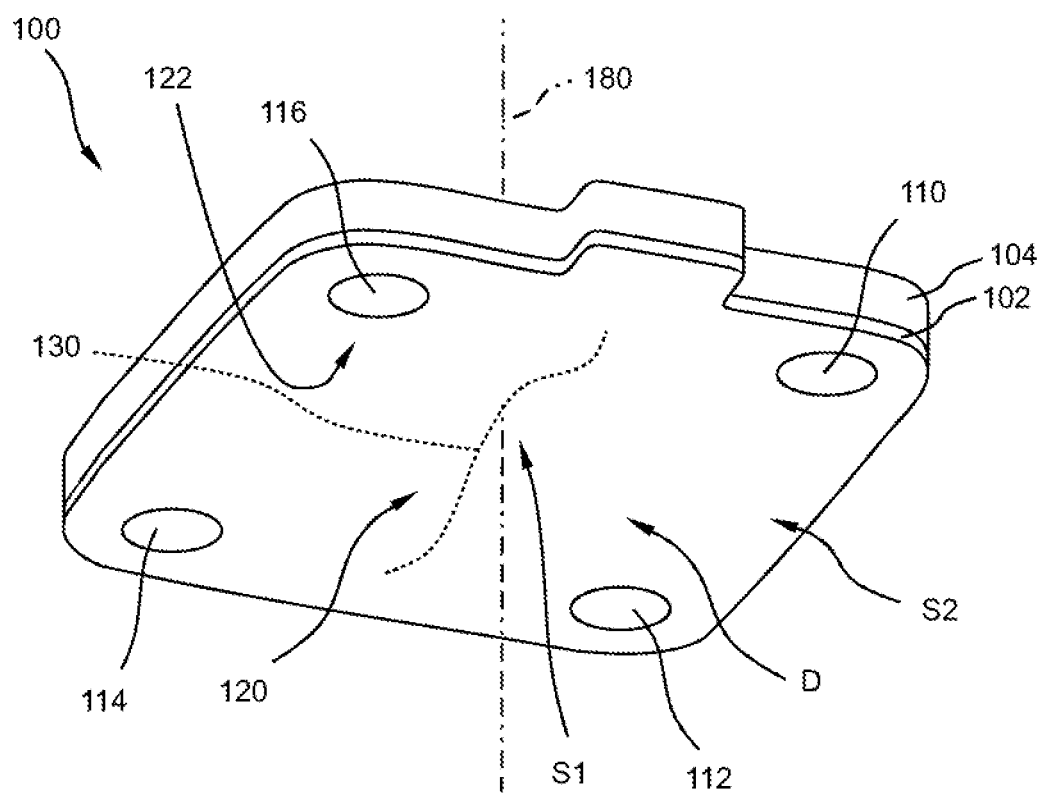
FIG. 1 shows a two-part diaphragm for a diaphragm valve.

FIG. 1 is a perspective view of an exemplary two-part diaphragm 100 comprising a first diaphragm 102 facing a valve body of a diaphragm valve and a second diaphragm 104 facing a drive of the diaphragm valve. The second diaphragm 104 is made of an elastomer, for example. Through-openings 110-116 are used, for example, in order that fastening means such as stud bolts can pass through. Of course, other embodiments are also conceivable, in particular diaphragms having a substantially round outer contour and/or without the through-openings 110-116. Of course, one-part diaphragms can also be implemented, which for example only have the first diaphragm 102.

The two-part diaphragm 100 is clamped in a lateral region between the valve body and the drive. A functional region 120 of the two-part diaphragm 100 is pressed onto the valve seat of the valve body in order to close the fluid channel formed by the valve body and a wet side 122 of the first diaphragm 102 for process fluid. The movement is caused by a drive rod which is moved by the drive along an adjustment axis 180 and which, for example, presses on the two-part diaphragm 100 with a pressure piece. Here, a sealing ridge 130, indicated in the drawing, of the first diaphragm 102 presses on the valve seat. Of course, the sealing ridge can also be omitted in other embodiments. Moving the two-component diaphragm 100 away from the valve seat opens the fluid channel. The diaphragm 102 is produced according to the method steps described below.

The adjustment axis 180 extends, for example, perpendicularly to an imaginary diaphragm plane in the region of an imaginary center point of the diaphragm.

The diaphragm 102 comprises a static, central region S1, which is pressed on the wet side onto the valve seat in order to close the diaphragm valve. With the exception of the pressure loads, this region S1 is not moved significantly.

The diaphragm 102 comprises a dynamic region D enclosing the central region S1. The dynamic region D ensures, through a movement, that the central region S1 can be lifted off the valve seat and releases a cross section for the flow of the process fluid. The movement of the dynamic region corresponds to a concentric flexing movement.

The diaphragm 102 comprises a static region S2 enclosing the dynamic region D. The diaphragm 102 is braced in this static region S2 between two components of the diaphragm valve and seals the diaphragm valve from the outside.

Figure 2:
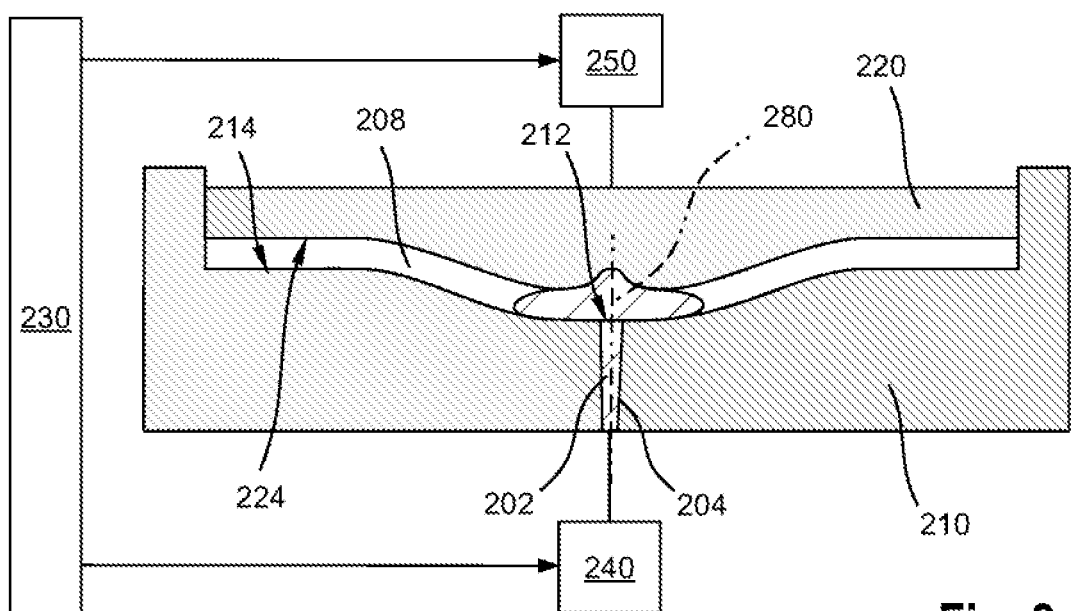
FIGS. 2, 4, 5, 7 and 9 each show a device for producing the diaphragm in a schematic section.

FIG. 2 shows, in a schematic section, a device for producing the diaphragm 102 from FIG. 1. For this purpose, a plastics melt 202 is fed through at least one feed channel 204 into a mold cavity 206. The mold cavity 206 is delimited by a first mold 210 and a second mold 220. The first mold 210 is arranged so as to be stationary. The second mold 220 is arranged so as to be movable with respect to the first mold 210. The adjustment axis of the diaphragm to be manufactured extends through the opening 212 of the at least one feed channel 204.

The first mold 210 with the at least one feed channel 204 has a negative contour 214 of the dry side of the diaphragm 102. The second mold 220 has a negative contour 224 of the wet side 122 of the diaphragm 102.

In another example, the feed channel 204 is assigned to the negative contour 224 of the wet side.

A state is shown in FIG. 2 in which the plastics melt 202 emerges from the feed channel 204 and spreads radially to the same extent in the mold cavity 206 through the central opening 212. Only after the shown state do the first and second molds 210, 220 begin to be moved toward one another.

The plastics melt 202 comprises at least one fluoropolymer, in particular a perfluoroalkoxy polymer, PFA. In one example, the plastics melt 202 is free of additives and consists, for example, only of the fluoropolymer, in particular the perfluoroalkoxy polymer, PFA.

A control unit 230 operates a plasticizing unit 240 and a linear drive 250 in accordance with the method steps described here. The plasticizing unit 240 is designed to plasticize the plastics material present, for example, in powder or pellet form and to feed the plastics melt produced to the feed channel 204. The linear drive 250 is designed to move the second mold 220 along an adjustment axis 280 which corresponds to the adjustment axis 180 of the diaphragm valve in which the diaphragm will later be used.

Figure 3:
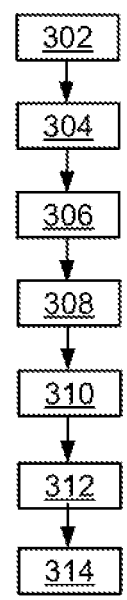
FIGS. 3 and 6 each show a schematic flow chart.

FIG. 3 is a schematic flow diagram. According to a step 302, the first and second molds 210, 220 are arranged at a distance from one another in a first position. The state after step 302 has been carried out is shown in FIG. 2. According to a step 304, the plastics melt is conveyed in the direction of the cavity or the mold cavity 208. The melt entering the cavity is distributed there. While the plastics melt is being conveyed, in a step 306 the second mold 220 begins to be moved out of the first position in the direction of the first mold 210. In a step 308, the conveyance of the plastics melt is stopped, while the pressure on the filled cavity is maintained. In a step 310, the second mold 220 is moved away from the first mold and the diaphragm is removed from the mold cavity with its sprue in a step 312. In a step 314, the sprue, which is formed at least in part by the plastics melt solidified in the feed channel, is removed. The sprue can be removed by sawing or punching along an imaginary parting plane. After performing step 314, trimming is visible at the point at which the sprue was severed.

Figure 4:
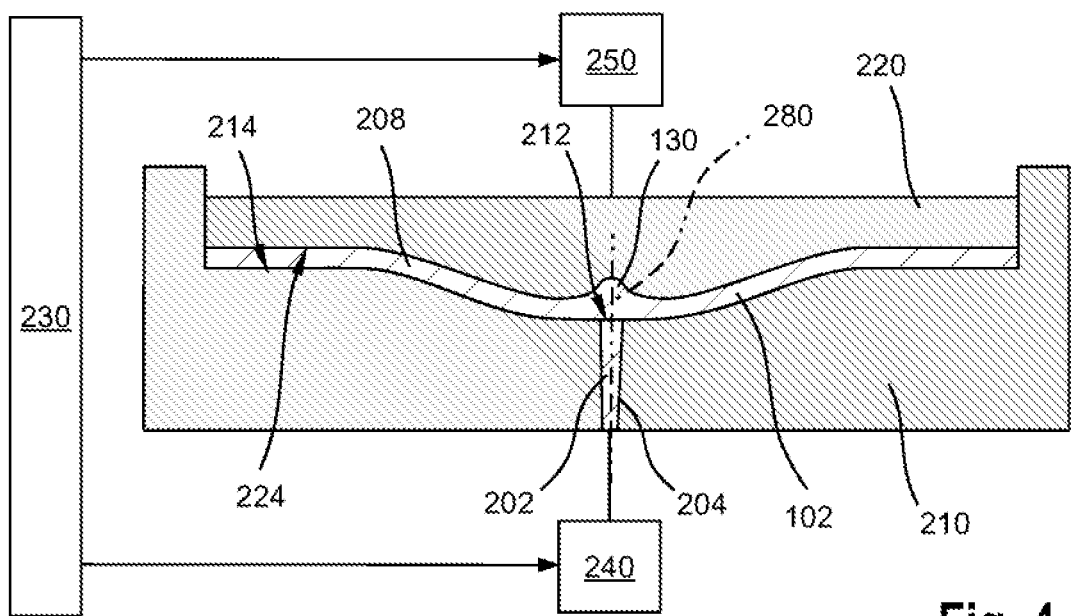

In contrast to FIG. 2, FIG. 4 shows the finished diaphragm 102 within the device. A state is thus shown in FIG. 4 in which the first and second molds 210, 220 have been moved toward one another and the diaphragm 102 has been pressed between the molds 210, 220. Correspondingly, FIG. 4 shows the state before step 310 of FIG. 3 was carried out.

In FIG. 4, the distance between the two molds 210, 220 corresponds to the wall thickness of the diaphragm 102. In FIG. 2, however, the distance between the two mold halves 210, 220 is approximately twice the wall thickness of the diaphragm 102 to be produced. Between the start of the conveyance of the plastics melt in the direction of the mold cavity and the end of the pressing process, the volume of the mold cavity is roughly halved. In further examples, the distance between the two mold halves can be reduced from a maximum opening or the maximum distance at the beginning of the entry of the melt to a minimum stroke which is between 25% and 75% of the maximum opening, the minimum stroke of a wall thickness corresponding to the diaphragm.

Figure 5:
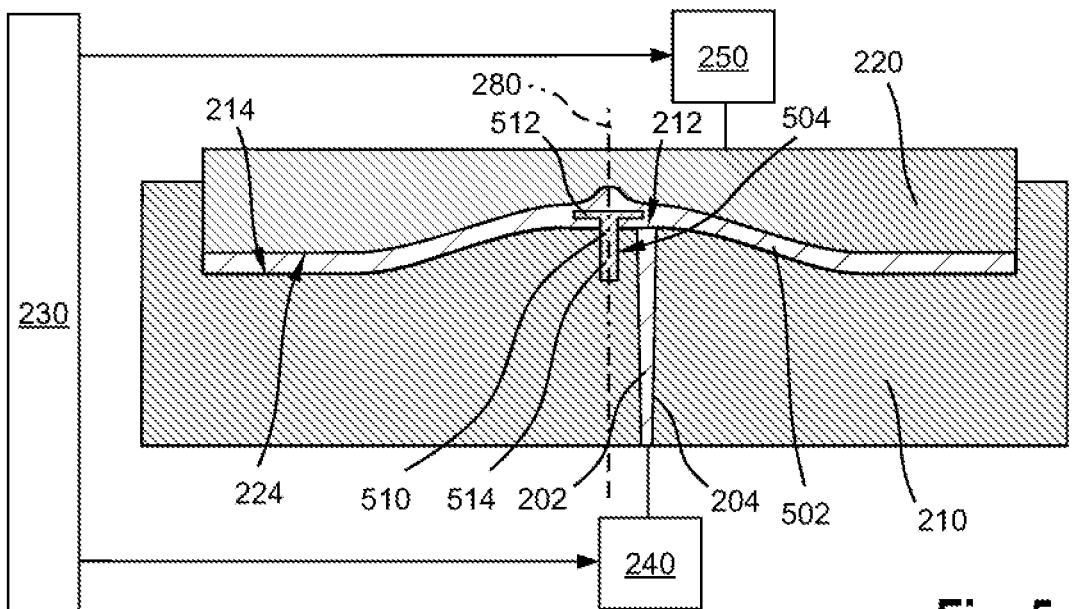
Figure 6:
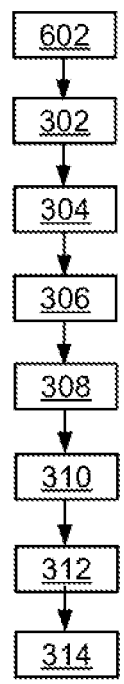

FIGS. 5 and 6 illustrate a further example for the production of the diaphragm 502. In contrast to the diaphragm 102 from the previous FIGS. 1, 2 and 4, the diaphragm 502 comprises a connecting pin 510. Furthermore, the opening 212 of the at least one feed channel 204 is arranged adjacent to an adjustment axis 180 of the diaphragm 102. The feed channel 204 therefore leads into the mold cavity at a point which is assigned to the static region S1 of the diaphragm 102 according to FIG. 1. Advantages result, for example, from the fact that the feed channel enters the mold cavity at a point which is assigned to one of the static regions S1, S2 of the diaphragm and/or the adjustment axis of the diaphragm, so that the plastics melt enters first at this region and spreads to other regions by flowing. The diaphragm is moved less in the static regions S1 and S2. Flow lines and edges therefore do not form in the moving region of the diaphragm between the static regions S1 and S2.

Going beyond the method according to FIG. 3, the method according to FIG. 6 comprises introducing 602 a connecting portion 512 of a connecting pin 510 for connection to a valve rod into a central recess 504 of the first mold 210, a holding portion 514 of the connection pin 510 being spaced apart from a surface of the first mold 210 surrounding the recess 504 and from a surface of the second mold 220.

Figure 7:
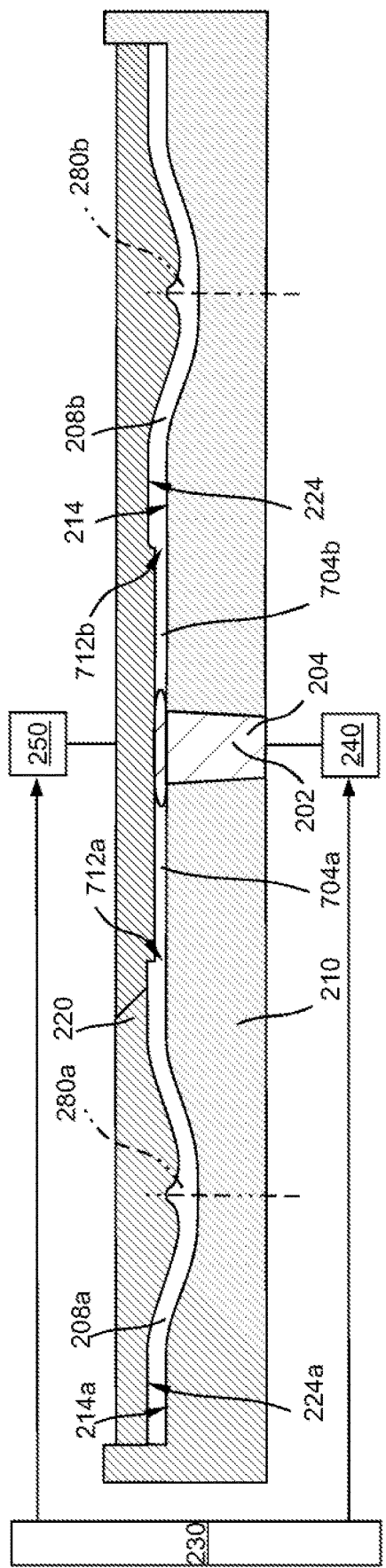
Figure 8:
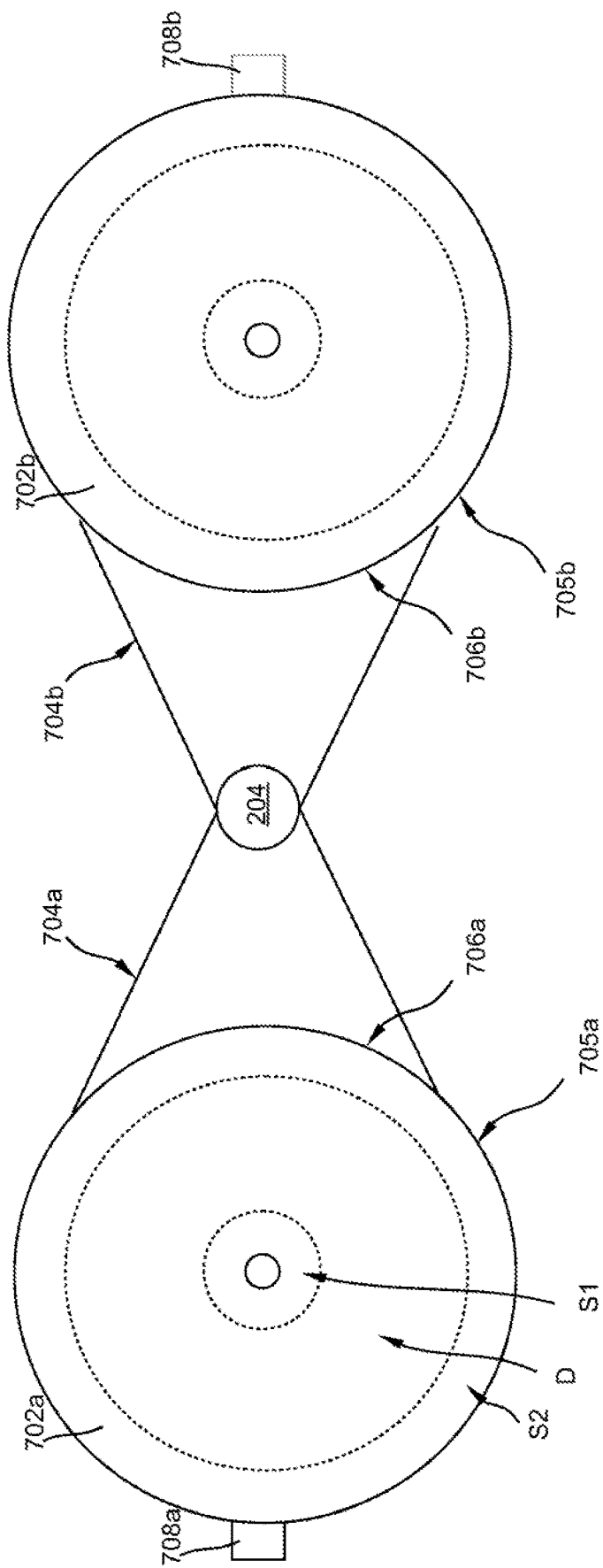
FIG. 8 shows two diaphragms in a schematic plan view with an exemplary feed channel structure of the device.

FIGS. 7 and 8 illustrate a realization of the previously explained method by means of a film sprue. FIG. 7 thus shows the device for producing at least one diaphragm 702a, 702b in a schematic section. For features not mentioned below, reference is made to the previous description, where indices "a" and "b" have been added to the reference signs in order to distinguish, for example, the two mold cavities 208a and 208b.

In contrast to the previous examples, the substantially circular diaphragm 702a, 702b is produced. Of course, the method outlined below and the method steps explained above can be transferred to round and angular outer contours of the particular diaphragm.

In contrast to the examples explained above, the plastics melt 202 is introduced between the two molds 210 and 220 via the common feed channel 204. Exiting from the feed channel 204, the melt is deflected into at least two further feed channels 704a and 704b, the extent of which, perpendicular to the plane of the drawing, increases in the direction of the respective mold cavities. The solidified plastics melt that is located in the feed channel 704a, 704b can also be referred to as a film sprue. At the end of the particular feed channel 704, 704b there is an opening 712a, 712b which represents the boundary to the particular mold cavity 208a, 208b. The opening 712a, 712b of the at least one feed channel 704a, 704b adjoins, in portions, a narrow side 705a, 705b of the diaphragm 702a-b to be produced. The feed channel 704a, 704b therefore leads into the mold cavity at a point which is assigned to the static region S1. The circular arc on which the opening 712a, 712b adjoins the diaphragm 702a, 702b has a central angle between 90° and 20°, in particular between 80° and 40°, more particularly between 70° and 50°. On this circular arc there is trimming 706a, 706b, which is created when the sprue is removed from the diaphragm 702a, 702b.

A tab 708a, 708b protruding beyond the outer contour of the diaphragm 702a, 702b, which tab is provided, for example, for the arrangement of an electronic data carrier, is located on the side of the diaphragm 702a, 702b opposite the trimming 706a, 706b.

Figure 9:
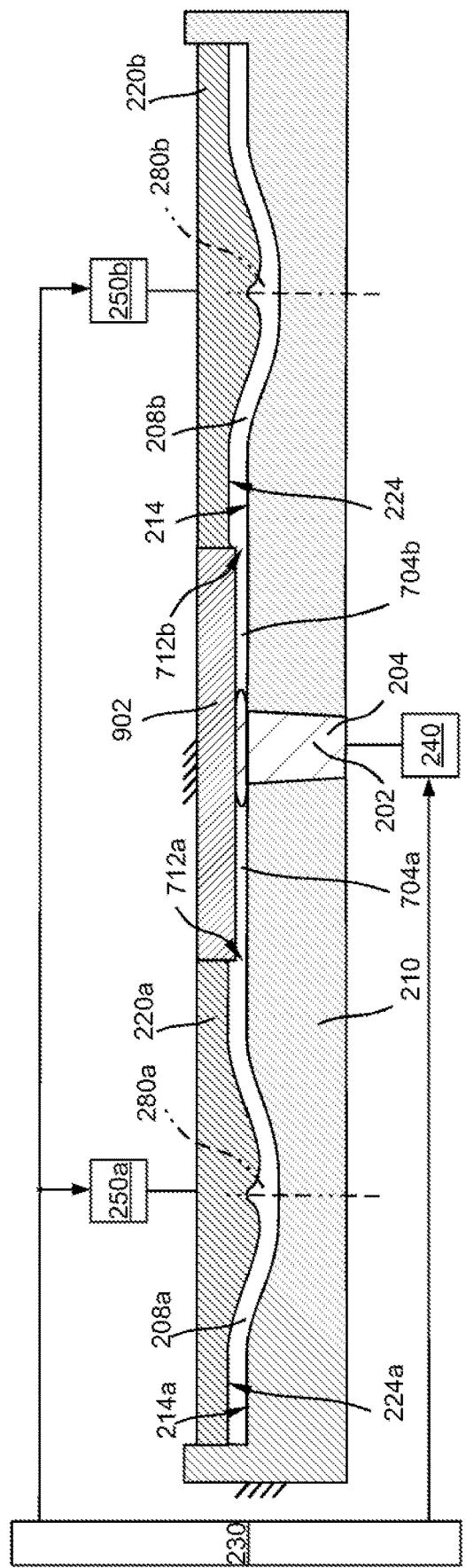

FIG. 9 shows, in a schematic section, the production of the at least one diaphragm 702a-b by means of the film sprue. For corresponding features, reference is made to FIGS. 7 and 8 and the description thereof. In contrast to FIG. 7, a mold half 902 and the mold half 210 are arranged so as to be fixed relative to one another. Mold halves 210a and 210b, in contrast, are movable at least along the axes 280a, 280b.

The control unit 230 operates a plasticizing unit 240 and at least one linear drive 250 or the linear drives 250a and 250b in accordance with the method steps describe here. The linear drives 250a and 250b are designed to move the assigned second mold 220a and 220b, respectively, along the relevant adjustment axis 280a, 280b, which corresponds to the adjustment axis 180 of the diaphragm valve in which the diaphragm will later be used.

The plasticizing unit 240 is designed to plasticize the plastics material present, for example, in powder or pellet form and to feed the plastics melt produced to the feed channel 204.

In contrast to the previously explained example in FIGS. 7 and 8, the plastics melt 202, after flowing through the common feed channel 204, meets the inner wall of the mold 904, which is fixed relative to the feed channel 204 and the relative position of which to the mold 210 and thus to the common feed channel 204 does not change until the diaphragm is removed. As it emerges from the feed channel 202, the melt is deflected into at least two further fixed feed channels 704a and 704b, the expansion of which perpendicular to the drawing plane and to the axes 280a-b increases in the direction of the respective mold cavities. The feed channels 704a and 704b are delimited by a mold 902 and the mold 210 in the present case, the two molds 902 and 210 being arranged so as to be stationary with respect to one another. This means that the feed channels 704a and 704b have a constant interior irrespective of the movement of the molds 220a and 220b, which has an advantageous effect on the flow properties of the melt. This results in lower speed differences and an associated lower shear, which has an advantageous effect on the material structure of the diaphragm produced. The solidified plastics melt, which is in the feed channel 704a, 704b, can also be referred to as a film sprue. At the end of the particular feed channel 704, 704b is the opening 712a, 712b of fixed size, which forms the boundary to the particular mold cavity 208a, 208b. The opening 712a, 712b of the at least one feed channel 704a, 704b partially adjoins a narrow side 705a, 705b of the diaphragm 702a-b to be produced. The feed channel 704a, 704b therefore leads into the mold cavity at a point which is assigned to the static region S1.

The feed channels 704a, 704b have a height, i.e. an expansion parallel to one of the axes 280a-b, that is smaller than the thickness of the diaphragm to be produced. In a form that is not shown, the feed channels 704a, 704b can also have the same height as the diaphragm to be produced.

What is claimed is:

1. A method for producing at least one valve diaphragm for a diaphragm valve, the method comprising:
   conveying a plastics melt through at least one feed channel into a mold cavity which is delimited by a first mold and at least two second molds;
   moving the first mold and the at least two second molds toward one another as the molten plastic is conveyed;
   removing the at least one valve diaphragm from the mold cavity; and
   cutting off a sprue from the at least one valve diaphragm removed from the mold cavity;
   wherein the first mold is arranged so as to be stationary, and wherein the at least two second molds are movable with respect to the first mold, wherein a stationary mold is arranged between the at least two second molds, which stationary mold at least partially delimits a feed channel opening into the mold cavity.

2. The method according to claim 1, wherein the valve diaphragm has a static, central region, a dynamic region enclosing the central region, and a static region enclosing the dynamic region, and wherein the feed channel leads into the mold cavity at a point which is assigned to one of the static regions.

3. The method according to claim 1, wherein an opening of the at least one feed channel is arranged adjacent to an adjustment axis of the valve diaphragm to be produced or the adjustment axis of the valve diaphragm to be produced extends through the opening of the at least one feed channel.

4. The method according to claim 1, wherein an opening of the at least one feed channel adjoins, in portions, a narrow side of the valve diaphragm to be produced.

5. The method according to claim 1, wherein the first mold with the at least one feed channel has a negative contour of the dry side of the valve diaphragm, and wherein the at least two second molds has a negative contour of the wet side of the valve diaphragm.

6. The method according to claim 1, comprising:
introducing a connecting portion of a connecting pin for connection to a valve rod into a central recess of the first mold, wherein a holding portion of the connecting pin is spaced apart from a surface of the first mold surrounding the recess and from a surface of the at least two second molds.

7. The method according to claim 1, wherein an inner volume of the at least one feed channel remains constant between the conveying and removing the at least one second mold.

8. The method according to claim 1, wherein an inner volume of the at least one feed channel decreases between the conveying and removing the at least two second molds.

9. The method according to claim 1, wherein the plastics melt comprises at least one fluoropolymer.

10. The method according to claim 1, wherein the plastics melt is free of additives.

\* \* \* \* \*